US012286986B2

(12) United States Patent
Ma

(10) Patent No.: US 12,286,986 B2
(45) Date of Patent: Apr. 29, 2025

(54) METHOD FOR MONITORING OPERATION OF A HYDRAULIC SYSTEM

(71) Applicant: Caterpillar Inc., Peoria, IL (US)

(72) Inventor: Pengfei Ma, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/239,478

(22) Filed: Aug. 29, 2023

(65) Prior Publication Data

US 2024/0068204 A1 Feb. 29, 2024

(30) Foreign Application Priority Data

Aug. 31, 2022 (GB) ...................................... 2212639

(51) Int. Cl.

*F15B 19/00* (2006.01)
*E02F 9/22* (2006.01)
*E02F 9/26* (2006.01)
*F15B 11/16* (2006.01)

(52) U.S. Cl.

CPC .......... *F15B 19/005* (2013.01); *E02F 9/2235* (2013.01); *F15B 11/165* (2013.01); *E02F 9/267* (2013.01); *F15B 2211/6313* (2013.01); *F15B 2211/6323* (2013.01); *F15B 2211/633* (2013.01); *F15B 2211/6336* (2013.01)

(58) Field of Classification Search

CPC .... F15B 9/03; F15B 9/09; F15B 11/08; F15B 11/10; F15B 19/005

See application file for complete search history.

(56) References Cited

U.S. PATENT DOCUMENTS

| | | | | |
|---|---|---|---|---|
| 6,392,562 | B1 | 5/2002 | Boston et al. | |
| 9,568,030 | B2 | 2/2017 | Gorman et al. | |
| 10,000,911 | B2 * | 6/2018 | You | G07C 5/0841 |
| 11,608,612 | B2 * | 3/2023 | Nakamura | E02F 9/2228 |
| 2005/0262838 | A1 | 12/2005 | Kageyama et al. | |
| 2016/0195093 | A1 | 7/2016 | Carpenter et al. | |
| 2017/0002549 | A1 | 1/2017 | You | |

(Continued)

FOREIGN PATENT DOCUMENTS

| | | | |
|---|---|---|---|
| EP | 1736841 | A1 | 12/2006 |
| JP | 6781127 | B2 | 11/2020 |
| KR | 20140048375 | A | 4/2014 |

OTHER PUBLICATIONS

European Extended Search Report for EP Patent Appln. No. 23191055.5, mailed Jan. 30, 2024 (8 pgs).

(Continued)

*Primary Examiner* — Michael Leslie

(57) ABSTRACT

The present invention pertains to method for monitoring operation of a hydraulic system, in particular of a hydraulic system of a working machine, having at least one hydraulic actuator. The method comprises a step of determining a predefined operating condition of the hydraulic system; a step of determining an input power parameter being indicative of a power provided by an engine to the hydraulic system during the predetermined operating condition; a step of determining an output power parameter being indicative of a power provided by the hydraulic actuator during the predetermined operating condition; and a step of determining a fault condition of the hydraulic system based on the input power parameter and the output power parameter.

13 Claims, 3 Drawing Sheets

(56) References Cited

U.S. PATENT DOCUMENTS

| | | | |
|---|---|---|---|
| 2017/0198831 | A1 | 7/2017 | Beschorner et al. |
| 2018/0058482 | A1 | 3/2018 | Carpenter et al. |
| 2019/0338792 | A1 | 11/2019 | Hayashi et al. |
| 2019/0376262 | A1 | 12/2019 | Koga |
| 2020/0284275 | A1 | 9/2020 | Butler et al. |
| 2022/0243746 | A1 | 8/2022 | Smith et al. |

OTHER PUBLICATIONS

Great Britain Search Report related to Application No. 2212639.5; reported on Feb. 23, 2023.

* cited by examiner

METHOD FOR MONITORING OPERATION OF A HYDRAULIC SYSTEM

CROSS-REFERENCE TO RELATED APPLICATION

This application claims priori der 35 USC $119 and the Paris Convention to Great Britain Patent Application No. 2212639.5 filed on Aug. 31, 2022.

TECHNICAL FIELD

The present invention pertains to a method for monitoring operation of a hydraulic system, in particular of a hydraulic system employed in a work machine, and to a monitoring unit of a hydraulic system which performs such a method.

TECHNOLOGICAL BACKGROUND

Work machines, such as hydraulic mining shovels or hydraulic excavators, typically include hydraulic systems for providing power to or actuating different components, e.g. for extending and retracting hydraulic cylinders. During operating life, components of the hydraulic system, such as a hydraulic pump or a relief valve, may experience wear, thereby adversely affecting the hydraulic system's efficiency and thus performance and productivity of a work machine. For example, when a relief valve or a hydraulic pump are wearing out, an operator of the work machine will feel that the machine has less power.

From the prior art, e.g. from US 2016/0195093 A1 and US 2018/0058482 A1, different methods are known to monitor proper operation of hydraulic pumps employed in such hydraulic systems.

SUMMARY OF THE INVENTION

Starting from the prior art, it is an objective to provide an improved method for monitoring operation of a hydraulic system, which in particular allows to recognize a fault condition of the hydraulic system which may be caused by different components. It is a further objective to provide a monitoring unit of a hydraulic system which performs such a method.

This objectives are solved by the subject matter of the independent claims. Preferred embodiments are set forth in the present specification, the Figures as well as the dependent claims.

Accordingly, a method is provided for monitoring operation of a hydraulic system having at least one hydraulic actuator. The method comprises a step of determining a predefined operating condition of the hydraulic system; a step of determining an input power parameter being indicative of a power provided by an engine to the hydraulic system during the predetermined operating condition; a step of determining an output power parameter being indicative of a power provided by the hydraulic actuator; and a step of determining a fault condition of the hydraulic system based on the input power parameter and the output power parameter.

Furthermore, a monitoring unit of a hydraulic system is provided. The monitoring unit may be used to perform the method as described above. Accordingly, technical features which are described in connection with the method hereinafter may also relate and be applied to the proposed monitoring unit, and vice versa.

The proposed monitoring unit is intended and designed for monitoring operation of a hydraulic system having at least one hydraulic actuator. The monitoring unit is configured for determining a predefined operating condition of the hydraulic system; determining an input power parameter being indicative of a power provided by an engine to the hydraulic system during the predetermined operating condition; determining an output power parameter being indicative of a power provided by the hydraulic actuator during the predetermined operating condition; and determining a fault condition of the hydraulic system based on the input power parameter and the output power parameter.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
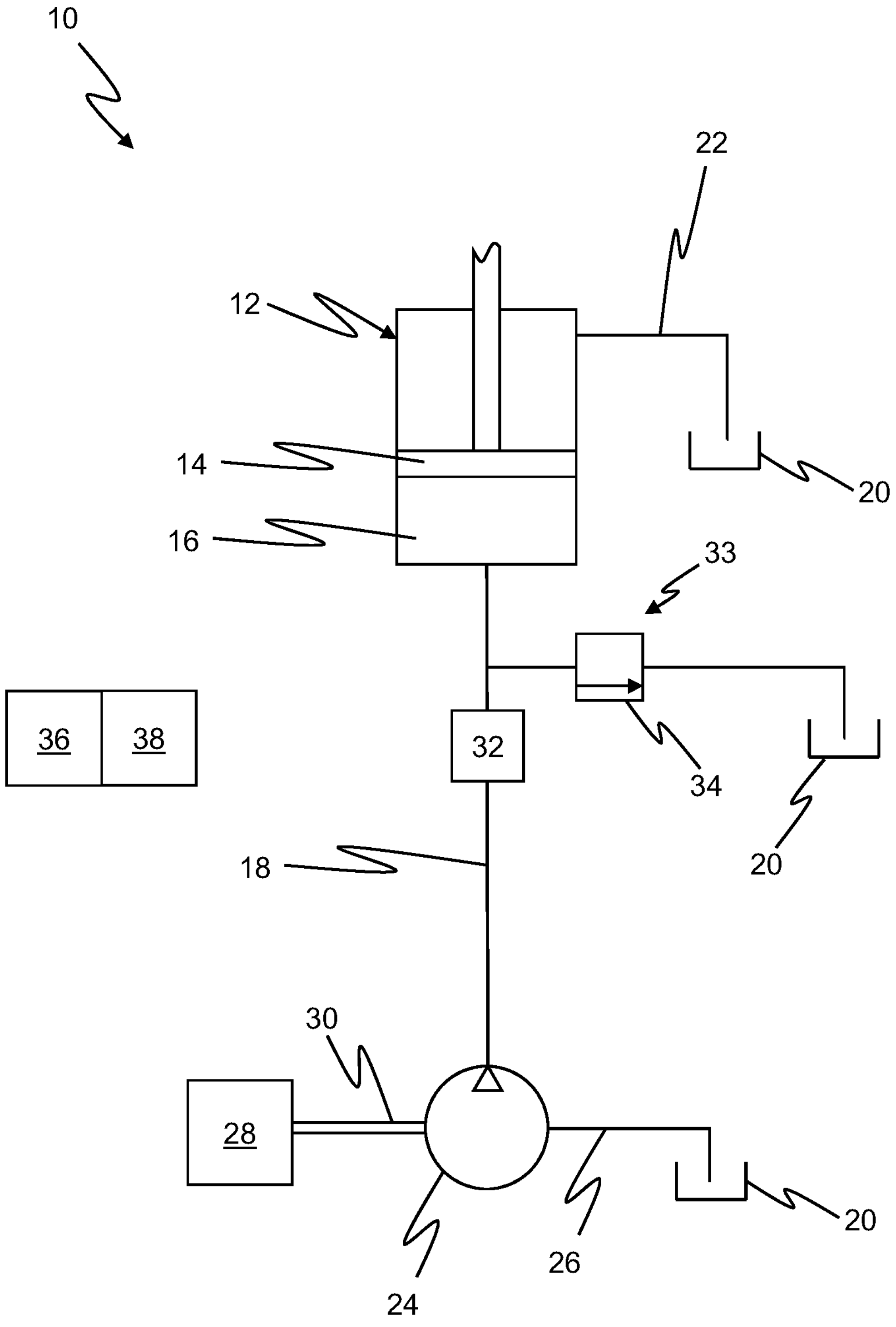
FIG. 1 schematically shows a hydraulic system of a work machine which comprises a monitoring unit for monitoring operation of the hydraulic system according to an embodiment of the present invention.

In the following, the invention will be explained in more detail with reference to the accompanying Figures. In the Figures, like elements are denoted by identical reference numerals and repeated description thereof may be omitted in order to avoid redundancies.

FIG. 1 depicts a hydraulic system 10 of a work machine, in particular of a heavy equipment, such as a hydraulic mining shovel or a hydraulic excavator. The proposed solution is not limited to this application and can be employed in any machine using hydraulics. Such machines may include, but not be limited to, loaders, excavators, trucks, pipe layers, graders, harvesters, lift trucks, paving machines, and the like, all of which may be wheeled or driven by tracks. In these applications, the hydraulic system 10 may be used to move arms or work tools of such machines.

The hydraulic system 10 comprises a plurality of hydraulic actuators 12, only one of which is exemplary depicted in FIG. 1. In the following, the structural and functional configuration of one hydraulic actuator 12 is specified which may apply correspondingly to the other hydraulic actuators of the hydraulic system 10. In the shown configuration, the hydraulic actuator 12 is provided in the form of a hydraulic cylinder configured to move a component of the machine by extending and retracting a piston 14 received in a cylinder barrel. The hydraulic cylinder 12 is actuated by supplying pressurized fluid, i.e. pressurized hydraulic fluid, into a pressure chamber 16 of the hydraulic actuator 12 via a supply line 18 or by discharging pressurized fluid from the pressure chamber 16 into a hydraulic tank 20 via a discharge line 22. By doing so, the piston 14 can be selectively extended and retracted so as to move a component of the work machine, in particular a work arm or work tool thereof, which is structurally connected to the piston 14 via a piston rod.

For pressurizing the hydraulic system 10, i.e. for providing pressurized fluid, at least one hydraulic pump 24 is provided. The hydraulic pump 24, which may be an axial piston pump, has an inlet line 26 fluid-communicatively connected to the hydraulic tank 20 and an outlet line which opens into the supply line 18. The hydraulic pump 24 is configured to pressurize fluid received from the hydraulic tank 20 and to supply the pressurized fluid into the supply line 18, in particular to supply pressurized fluid to the hydraulic actuator 12 via the supply line 18.

The hydraulic pump 24 is driven or powered by an engine 28, in particular an internal combustion engine, such as a diesel engine. For doing so, the engine 28 may be torque-transmittingly connected to the hydraulic pump 24 via a gear unit 30. As such, the engine 28 is configured to power the hydraulic system 10, i.e. to generate or provide power which is input into the hydraulic system 10.

In the supply line 18, a plurality of supply valves 32 are provided which are configured for selectively opening the supply line 18 towards the plurality of hydraulic actuators 12. In this way, the supply of pressurized fluid to each one of the plurality of hydraulic actuators 12 and thus actuation of each hydraulic actuator 12 can be controlled.

Further, the hydraulic system 10 comprises a line relief 33 having a relief valve 34 which is fluid-communicatively connected to the supply line 18. Specifically, the line relief 33 is connected to the supply line 18 downstream of the supply valves 32. Accordingly, the hydraulic system 10 comprises at least one relief valve 34 per hydraulic actuator 12. In the context of the present disclosure, the term "downstream" refers to a flow direction of the hydraulic fluid through the supply line 18. As such, the relief valve 34 is configured to selectively discharge pressurized fluid form the supply line 18 into the hydraulic tank 20.

The hydraulic system 10 further comprises an electronic control unit 36, also referred to as "control unit" in the following. The control unit 36 is configured to control operation of the hydraulic system 10. For doing so, the control unit 36 is communicably connected to the engine 28, the pump 24, the supply valves 32, the relief valve 34, and to further operable components (not shown) of the hydraulic system 10.

The basic structure and function of such a hydraulic system 10 is well known to a person skilled in the art and are thus not further specified. Rather, a method for monitoring operation of such a hydraulic system 10 and components of the hydraulic system 10 used for employing such a method, which are interlinked with the present invention, are addressed in the following. It is apparent to the skilled person that the hydraulic system 10 as described above may include further components, such as further valves, etc., which are not further described herein.

For monitoring operation of the hydraulic system 10, the hydraulic system 10 further comprises a monitoring unit 38. As such, the monitoring unit 38 is configured to perform a function for monitoring operation of the hydraulic system 10. In other words, the monitoring unit 38 is configured to perform the method of monitoring the hydraulic system 10.

The monitoring unit 38 may be any type of device or any type of component capable of interpreting and/or executing information and/or instructions stored within a memory to perform one or more functions, in particular to perform the method of monitoring operation of the hydraulic system 10. The monitoring unit 38 may be included in or may be constituted by the control unit 36. According to this configuration, the monitoring unit may be a part of the control unit 36, in particular a function module, more specifically a software module, of the control unit 36. Alternatively, the monitoring unit 38 may be provided separately from the control unit 36, in particular functionally and/or structurally separately, from the control unit 36.

Figure 2:
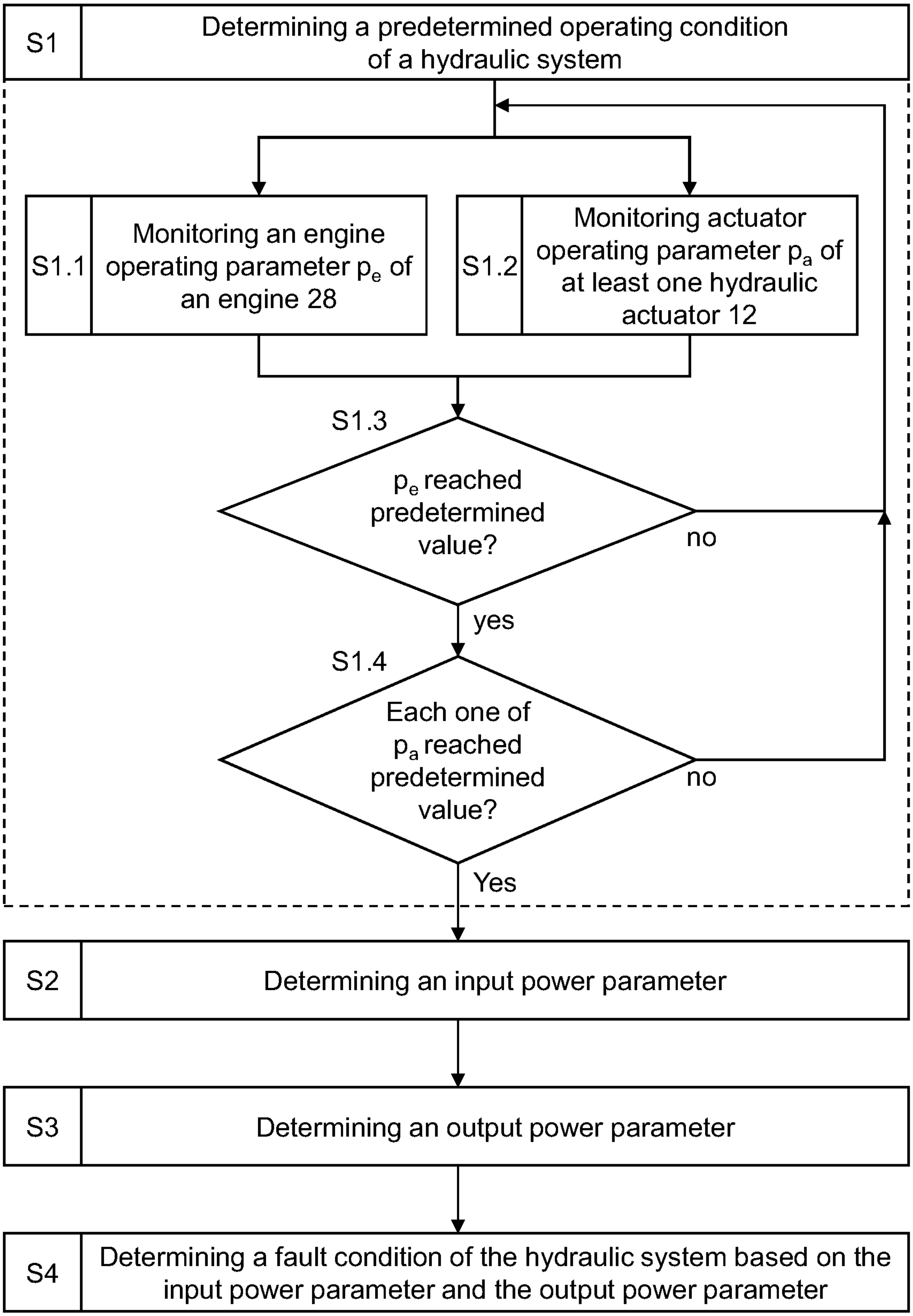
FIG. 2 shows a flow diagram illustrating a method for monitoring operation of the hydraulic system according to an embodiment of the present invention.

FIG. 2 depicts a flow diagram of the method carried out by the monitoring unit 38 for monitoring operation of the hydraulic system 10. In a step S1, the monitoring unit 38 determines a predefined operating condition of the hydraulic system 10, in particular of the engine 28 and at least one hydraulic actuator 12. That is, the monitoring unit 38 is configured to, in step S1, determine whether the hydraulic system 10 is in the predefined operating state or not. In other words, the monitoring unit 38 is configured to recognize when the hydraulic system 10, in particular the engine 28 and the at least one hydraulic actuator 12, has reached the predetermined operating condition during operation. In the shown configuration, the predetermined operating condition refers to a state in which the engine 28 and the at least one hydraulic actuator 12 have reached an associated predetermined operating condition.

Accordingly, in a sub-step S1.1, the monitoring unit 38 is configured to monitor or determine at least one engine operating parameter P e of the engine 28 being indicative of operating condition of the engine 28. Further, in a sub-step S1.2, the monitoring unit 38 is configured to monitor or determine actuator operating parameters p a of the at least one hydraulic actuator 12, in particular of all hydraulic actuators 12 employed in the hydraulic system 12, being indicative of the predetermined operating condition of the hydraulic actuators 12. Specifically, in sub-step S1.2, the monitoring unit 38 may be configured to monitor or determine operating parameters of all components in the hydraulic system 1 which can be actuated or powered by the pressurized fluid, i.e. which can consume hydraulic power from the hydraulic system 10.

Then, in sub-step S1.3, the monitoring unit 38 determines whether the at least one engine operating parameter P e lies within a predetermined range or has reached a predetermined value. If this is true, the method proceeds to sub-step 1.4 in which the monitoring unit 38 determines whether each one of the actuator operating parameters p a lies within an associated predetermined range or has reached an associated predetermined value. If this is true, the monitoring unit 38 recognizes the predetermined operating condition and proceeds to step S2. If this is not true the monitoring unit continues to monitor the operating parameters. As such, step S1 may be repeatedly performed, in particular at regular time intervals.

Specifically, in sub-step S1.1, the monitoring unit 38 is configured to determine and monitor an engine operating parameter being indicative of the operation of the engine. More specifically, the engine operating parameter may be or may be indicative of a speed and/or an output torque of the engine 28. For example, for determining and measuring the engine operating parameter, the monitoring unit 38 may be communicably connected to an engine sensor (not shown) configured to measure engine speed. Then, based on the determined engine speed, the monitoring unit 38 may determine the predetermined operating condition of the engine 28, for example whether the engine is in a high-load or partial-load condition, to decide whether the predetermined operating condition is met or not.

In sub-step S1.2, the monitoring unit 38 is configured to monitor operating parameters of the plurality of hydraulic actuators 12. For example, the operating parameters of a hydraulic actuator 12 may be indicative of whether the associated hydraulic actuator 12 is actuated or not, i.e.

whether the piston 14 of the associated hydraulic actuator 12 is moved, and in which direction the associated hydraulic actuator 12 is actuated, i.e. whether the piston 14 of the hydraulic actuator 12 is extracted or retracted. For example, for determining and measuring the operating parameter of the hydraulic actuators 12, displacement sensors (not shown) associated with each hydraulic actuator 12 may be provided for measuring displacement of the associated hydraulic actuator 12. Based on the measured displacement, the monitoring unit 38 may be configured to determine or calculate movement of the hydraulic actuators 12, in particular in which direction the hydraulic actuator 12 moves and/or the velocity the hydraulic actuator 12 is moving at.

The predetermined operating condition to be determined in step S1 may be an operating condition during which the engine 28 powers the hydraulic system 10 and during which a predetermined number or group of hydraulic actuators 12, in particular a single hydraulic actuator 12, is actuated, in particular while the other hydraulic actuators of the plurality of hydraulic actuators 12 is not actuated.

In the following, the predetermined operating condition is further specified with reference to FIGS. 3 to 5 which illustrate different operating parameters of the hydraulic system 10 for the same period of time. In each one of FIGS. 3 to 5, a time period 40 is indicate during which the predetermined operating condition is present.

Figure 3:
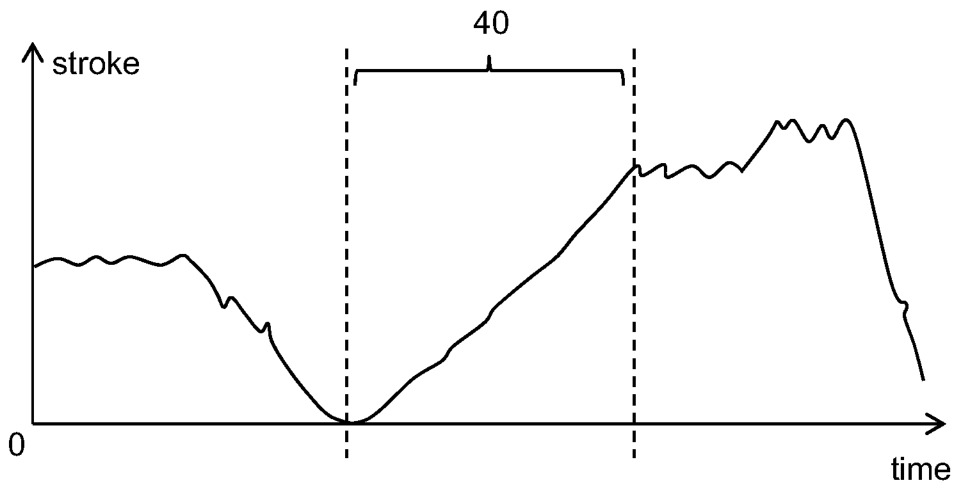
FIGS. 3 to 5 show diagrams illustrating different operating parameters of the hydraulic system over time.

Specifically, FIG. 3 depicts a diagram schematically illustrating actuation, in particular displacement, of the hydraulic actuator 12 by quantifying a stroke of the hydraulic actuator 12 over time. Specifically, the ordinate of the diagram of FIG. 3 depicts the stroke of the hydraulic actuator 12 and the abscissa of the diagram depicts the time.

Figure 4:
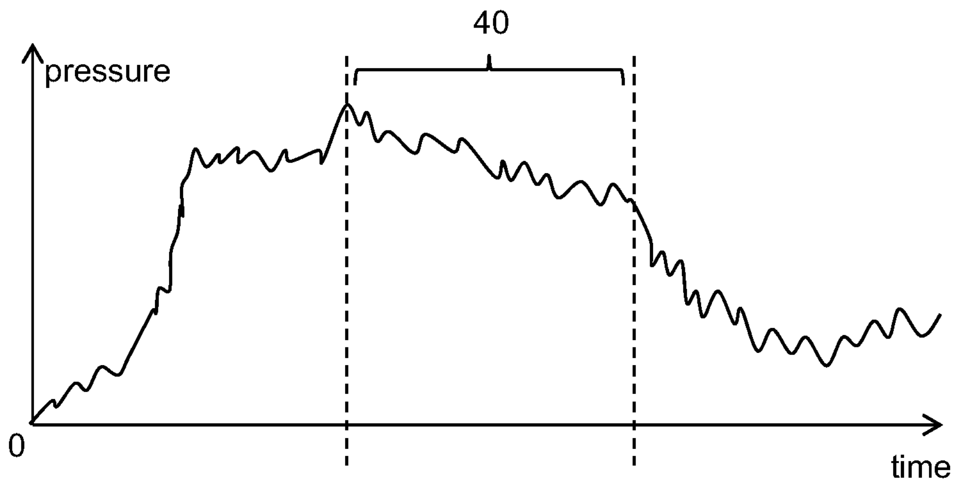

FIG. 4 depicts a diagram schematically illustrating a pressure prevailing in the hydraulic actuator 12, in particular a headend pressure of the hydraulic actuator 12, over time. Specifically, the ordinate of the diagram of FIG. 4 depicts a value of the pressure prevailing in the hydraulic actuator 12 and the abscissa of the diagram depicts the time.

Figure 5:
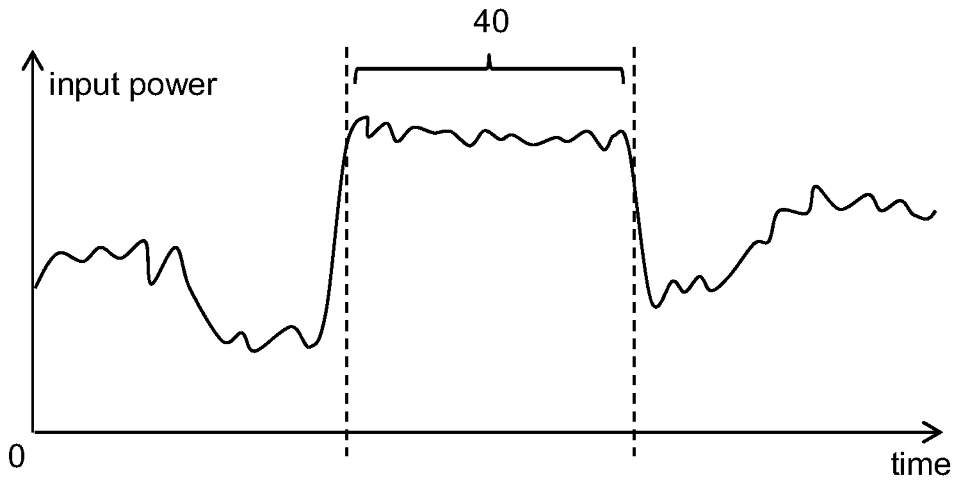

FIG. 5 depicts a diagram schematically illustrating the input power, i.e. the power generated by the engine 28 which is input into the hydraulic system 10, over time. Specifically, the ordinate of the diagram of FIG. 5 quantifies the input power and the abscissa of the diagram depicts the time.

Specifically, during the predetermined operating condition, the power provided by the engine 28, i.e. the input power of the hydraulic system 10, is constant or substantially constant, in particular for a predetermined period of time, as depicted in FIG. 5. For example, the predetermined period of time may be in the range between 1 second to 10 seconds, in particular in the range between 1 second to 5 seconds, for example 2 seconds or 3 seconds or 4 seconds. Alternatively or additionally, during the predetermined operating condition, the speed of the engine 28 and/or the torque of the engine 28 is/are constant or substantially constant, in particular for the predetermined period of time.

More specifically, in the shown embodiment, during the predetermined operating condition, the engine 28 is run at a maximum speed and/or at a maximum output torque. Further, during the predetermined operating condition, the at least one hydraulic actuator 12 is actuated, i.e. extended or retracted, at maximum power. For doing so, the supply valve 32 associated to the hydraulic actuator 12 may be fully opened during the predetermined operating condition, while the other supply valves 32 associated to other hydraulic actuators 12 are closed.

Further, during the predetermined operating condition, the at least one hydraulic actuator 12 moves at a substantially stable velocity. In other words, as can be gathered from FIG. 3, the stroke of the hydraulic actuator 12 has substantially stable gradient. The stroke of the hydraulic actuator 12 is a function of hydraulic actuator pressure. As such, during the predetermined operating condition, the product of velocity and the hydraulic actuator pressure may be constant or substantially constant.

Still further, during the predetermined operating condition, the at least one hydraulic actuator 12 may be the only hydraulic actuators 12 or components in the hydraulic system 10 which is/are actuated or consuming hydraulic power. Specifically, one or more than one hydraulic actuator 12 may be actuated during the predetermined operating condition.

Once the predetermined operating condition has been determined by the monitoring unit 38, the method proceeds to steps S2 and S3 which may be performed one after the other, as depicted in FIG. 2, or in parallel.

In step S2, the monitoring unit 38 is configured to determine an input power parameter during the predetermined operating condition. The input power parameter is indicative of a power which is provided by the engine 28 to the hydraulic system 10, in particular to the hydraulic pump 24, during the predetermined operating condition. In the shown configuration, the input power parameter corresponds to, i.e. quantifies, the power which is input by the engine 28 into the hydraulic system 10, in particular into the hydraulic pump 24.

Specifically, the monitoring unit 38 is configured to determine and monitor an engine operating parameter being indicative of the power generated by the engine 28. More specifically, the engine operating parameter may be or may be indicative of a speed and/or an output torque of the engine 28. In the shown embodiment, for determining and measuring the engine operating parameter, the monitoring unit 38 makes use of the above described engine sensor configured to measure engine speed. Then, based on the determined engine speed, the monitoring unit 38 calculates or derives the power generated by the engine 28, i.e. the power input from the engine 28 into the hydraulic system 10, in particular to the hydraulic pump 24. Alternatively or additionally, a torque sensor may be used to determine an output torque of the engine 28, based on which the monitoring unit 38 may calculate or derive the power generated by the engine 28. In other words, in step S2, the input power provided by the engine 28 may be quantified or determined based on at least one of a speed and an output torque of the engine 28 during the predetermined operating condition.

In a further development, step S2 may be performed such that the input power parameter is determined by determining a mean value of the input power or input power parameter for a time period during the predetermined operating condition. In other words, the input power or the input power parameter may be determined at different points in time during the predetermined operating condition, based on which a mean value is calculated constituting the input power parameter determined in step S2.

In step S3, the monitoring unit 38 is configured to determine an output power parameter during the predetermined operating condition. The output power parameter is indicative of a power provided by the hydraulic actuator 12 during the predetermined operating condition. Specifically, in the shown configuration, the output power parameter corresponds to, i.e. quantifies, the power provided by the hydraulic actuator. In step S3, the output power parameter is determined or calculated as a function of a pressure prevailing in a cylinder of the hydraulic actuator 12 and a supply flow parameter being indicative of a volumetric flow rate of hydraulic fluid supplied to the hydraulic actuator 12.

More specifically, the pressure prevailing in the hydraulic actuator 12 preferably is a headend pressure of the hydraulic actuator 12. For determining the headend pressure of the hydraulic actuator 12, the monitoring unit 38 may be communicably connected to a pressure sensor included in or attached to the hydraulic cylinder 12 configured to measure the headend pressure of the hydraulic cylinder 12 and to transmit the measured pressure to the monitoring unit 38.

Further, the monitoring unit 38 is configured to determine the supply flow parameter of the hydraulic actuator 12. Specifically, in the shown configuration, the supply flow parameter corresponds to, i.e. quantifies, the volumetric flow rate of hydraulic fluid supplied into the hydraulic actuator 12. For determining the volumetric flow rate, the monitoring unit 38 is configured to, at first, determining a velocity of the piston 14 of the hydraulic actuator 12. Then, based on the determined velocity, to determine the volumetric flow rate. For doing so, the monitoring unit 38 may take into account the structural design of the hydraulic actuator 12, in particular of its piston 14. Specifically, the monitoring unit 38 may be configured to determine the volumetric flow rate based on the velocity of the piston 14 and a surface of the piston 14 which delimits the pressure chamber 16, in particular by multiplying the velocity with the size of the surface of the piston 14.

For determining the velocity, the monitoring unit 38 may use the above described displacement sensor which is configured for measuring a displacement of the piston 14 of the hydraulic actuator 12. Specifically, the displacement sensor may measure a position and a course of a position of the hydraulic actuator's piston 14 and transmit the measured data to the monitoring unit 38. Based on the received measurement data of the displacement sensor, the monitoring unit 38 may be configured to then calculate the velocity of the piston 14, in particular by determining the derivate of the position with respect to time.

As set forth above, in step S3, the output power parameter is determined or calculated as a function of the pressure prevailing in a cylinder of the hydraulic actuator 12 and the supply flow parameter which quantifies the volumetric flow rate of hydraulic fluid supplied to the hydraulic actuator 12. For doing so, the monitoring unit 38 multiplies the pressure prevailing in a cylinder of the hydraulic actuator 12 with the determined volumetric flow rate, thereby obtaining the output power parameter. By doing so, the output power parameter indicates a hydraulic power provided by the hydraulic actuator.

In a further development, step S3 may be performed such that the output power parameter is determined by determining a mean value of the output power or output power parameter for a time period during the predetermined operating condition. In other words, the output power or the output power parameter may be determined at different points in time during the predetermined operating condition, based on which a mean value is calculated constituting the output power parameter determined in step S3.

The method further comprises a step S4 of determining a fault condition. In the context of the present disclosure, the term "fault condition" refers to a condition of the hydraulic system 10 in which the hydraulic system 10 is subjected to an unintended efficiency drop, thereby degrading the work machines performance and productivity. For example, the fault condition may indicate that one or more components of the hydraulic system are subjected to excessive wear which, when not being repaired or replaced, may cause damage of the hydraulic system. In particular, the fault condition may indicate a fault condition of the line relief 33, in particular the relief valve 34, or the hydraulic pump 24.

Specifically, in step S4, the monitoring unit 38 is configured to determine a fault condition of the hydraulic system 10 based on the input power parameter and the output power parameter, in particular based on a comparison of the input power parameter and the output power parameter. More specifically, in step S4, the monitoring unit 38 is configured to calculate a difference between the input power parameter and the output power parameter. The thus determined difference is then compared to a threshold to determine a fault condition. For example, in case the calculated difference has reached the threshold, the monitoring unit 38 determines the fault condition which then is indicated to an operator of the work machine. In case the calculated difference has not reached the threshold, the monitoring unit does not determine and thus does not output a fault condition.

Preferably, the threshold is a time-dependent variable, in particular an operating-hour-dependent variable, i.e. dependent on the operating hours of the hydraulic system 1. As such, the value of the threshold is a function of operating hours of the hydraulic system 10. In other words, with increasing operating hours, the value of the threshold may change, in particular the value of the threshold may decrease or increase. By this configuration, the method takes into account that the hydraulic system 10, in particular the line relief 33 and the hydraulic pump 24, inherently wears out during its operating life. Thus, by using the operating-hour-dependent threshold, the method allows to reliably determine a fault condition also at the beginning of the hydraulic system's operating life.

In a further development, the method may comprise a further step of determining a fault condition of the hydraulic pump 24. Specifically, in case a fault condition is determined in step S4, the method may proceed to the further step, in particular to localize the fault condition in the hydraulic system 10. Step S5 of determining a fault condition of the hydraulic pump 24 may be performed according to the methods describe in US 2016/0195093 A1 or US 2018/0058482 A1. When in step S5 a fault condition of the hydraulic pump 24 is determined, the monitoring unit 38 outputs a warning to the operator of the work machine indicating that the hydraulic pump 24 may have a fault condition. In case in step S5 no fault condition of the hydraulic pump 24 is determined, the method may proceed to a further step in which a warning is output to the operator of the work machine indicating that the line relief 33, in particular the relief valve 34, may have a fault condition.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention. This particularly applies in view of the technical features described in the following.

A method may be provided for monitoring operation of a hydraulic system, in particular of a hydraulic system of a working machine, having at least one hydraulic actuator. The method comprises a step of determining a predefined operating condition of the hydraulic system; a step of determining, during the predetermined operating condition, an input power parameter being indicative of a power provided by an engine to the hydraulic system; a step of determining, during the predetermined operating condition, an output power parameter being indicative of the power provided by the hydraulic actuator; and a step of, determining a fault condition of the hydraulic system based on the input power parameter and the output power parameter.

By determining a fault condition of the hydraulic system based on the input power parameter and the output power parameter, the proposed method allows to identify a fault condition which may be caused by different components of the hydraulic system, such as by a line relief, in particular a relief valve, and a hydraulic pump. In this way, a method is provided which may be cost-efficiently implemented and which allows to reliably and more widely monitor operation of the hydraulic system.

The proposed method may be employed in any machine using hydraulics, such as in work machines, in particular in heavy equipment, such as a hydraulic mining shovels or a hydraulic excavators.

The hydraulic system may further comprise a hydraulic pump actuated by the engine and configured for supplying pressurized fluid to the hydraulic actuator, in particular via a supply line. Further, the hydraulic system may comprise a relief valve configured to selectively discharge pressurized fluid from the supply line.

Specifically, during the predetermined operating condition, the engine may power the hydraulic system, in particular may drive the hydraulic pump, and the hydraulic actuator may be actuated, in particular may be extracted or retracted. Alternatively or additionally, during the predetermined operating condition, the power provided by the engine may be constant or substantially constant, in particular for a time period in the range between 1 second to 5 seconds. In other words, during the predetermined operating condition, the output power parameter may be constant or substantially constant, in particular for a time period in the range between one 1 second to 5 seconds. Alternatively or additionally, during the predetermined operating condition, the engine may run at a maximum speed and/or at a maximum output torque. Alternatively or additionally, during the predetermined operating condition, the hydraulic actuator may be actuated, in particular may be extracted or retracted, at maximum power. Alternatively or additionally, during the predetermined operating condition, the product of a velocity of the hydraulic actuator and a hydraulic actuator pressure may be constant or substantially constant. Alternatively or additionally, during the predetermined operation condition, the hydraulic actuator may be the only hydraulic actuator in the hydraulic system which is actuated. Alternatively or additionally, during the predetermined operating condition, more than one hydraulic actuator may be actuated, while other hydraulic actuators or other components consuming hydraulic power from the hydraulic system may not be actuated, thereby not consuming hydraulic power during the predetermined operating condition.

In a further development, the input power parameter may be determined based on at least one of a speed and an output torque of the engine.

Alternatively or additionally, the output power parameter may quantify the output power, i.e. the power provided by the hydraulic actuator. The output power parameter may be determined based on a pressure prevailing in a cylinder of the hydraulic actuator and a supply flow parameter being indicative of a volumetric flow rate of hydraulic fluid supplied to the hydraulic actuator. Further, the supply flow parameter may be determined based on a measured displacement of a piston of the hydraulic actuator.

In a further development, in the step of determining the fault condition, a difference between the input power parameter and the output power parameter may be calculated and compared to a threshold, in particular to determine a fault condition. Further, a value of the threshold may be determined as a function of operating hours of the hydraulic system.

Furthermore, a monitoring unit of a hydraulic system may be provided for monitoring operation of the hydraulic system having at least one hydraulic actuator. The monitoring unit may be configured for determining a predefined operating condition of the hydraulic system; determining an input power parameter being indicative of a power provided by an engine to the hydraulic system during the predetermined operating condition; determining an output power parameter being indicative of the power provided by the hydraulic actuator during the predetermined operating condition; and determining a fault condition of the hydraulic system based on the input power parameter and the output power parameter.

INDUSTRIAL APPLICABILITY

With reference to the Figures, a method for monitoring operation of a hydraulic system 10 and the monitoring unit 28 for performing such a method are suggested. The method in the monitoring unit 28 as suggested above are applicable in any suitable hydraulic system having at least one hydraulic actuator. The monitoring unit 28 may serve as a replacement or retrofit part.

What is claimed is:

1. A method for monitoring operation of a hydraulic system of a working machine, having at least one hydraulic actuator, comprising:

a step of determining a predefined operating condition of the hydraulic system;

a step of determining an input power parameter being indicative of a power provided by an engine to the hydraulic system during the predetermined operating condition;

a step of determining an output power parameter being indicative of a power provided by a hydraulic actuator during the predetermined operating condition; and a step of determining a fault condition of the hydraulic system based on the input power parameter and the output power parameter; and a step of determining the output power parameter further based on a pressure prevailing in a cylinder of the hydraulic actuator and a supply flow parameter being indicative of a volumetric flow rate of hydraulic fluid supplied to the hydraulic actuator.

2. The method according to claim 1, wherein the hydraulic system further comprises a hydraulic pump driven by the engine and configured for supplying pressurized fluid to the hydraulic actuator via a supply line.

3. The method according to claim 1, wherein during the predetermined operating condition, the engine powers the hydraulic system and the hydraulic actuator is actuated.

4. The method according to claim 1, wherein during the predetermined operating condition, the power provided by the engine is constant or substantially constant, for a time period in the range between 1 second to 5 seconds.

5. The method according to claim 1, wherein during the predetermined operating condition, the engine is run at a maximum speed or at maximum output torque.

6. The method according to claim 1, wherein during the predetermined operating condition, the hydraulic actuator is actuated, extracted or retracted, at maximum power.

7. The method according to claim 1, wherein during the predetermined operating condition, the product of a velocity of the hydraulic actuator and a hydraulic actuator pressure is constant or substantially constant.

8. The method according to claim 1, wherein during the predetermined operation condition, the hydraulic actuator is the only hydraulic actuator in the hydraulic system which is actuated.

9. The method according to claim 1, wherein the input power parameter is determined based on at least one of a speed and an output torque of the engine.

10. The method according to claim 9, wherein the supply flow parameter is determined based on a measured displacement of a piston of the hydraulic actuator.

11. The method according to claim 1, wherein in the step of determining the fault condition, a difference between the input power parameter and the output power parameter is calculated and compared to a threshold.

12. The method according to claim 11, wherein a value of the threshold is determined as a function of operating hours of the hydraulic system.

13. A monitoring unit of a hydraulic system for monitoring operation of the hydraulic system having at least one hydraulic actuator, wherein the monitoring unit is configured for:

determining a predefined operating condition of the hydraulic system;

determining an input power parameter being indicative of a power provided by an engine to the hydraulic system during the predetermined operating condition;

determining an output power parameter being indicative of a power provided by the at least one hydraulic actuator during the predetermined operating condition; and determining a fault condition of the hydraulic system based on the input power parameter and the output power parameter; and a step of determining the output power parameter further based on a pressure prevailing in a cylinder of the hydraulic actuator and a supply flow parameter being indicative of a volumetric flow rate of hydraulic fluid supplied to the hydraulic actuator.

* * * * *